INCREMENTALLY DRIVEN RECORDING APPARATUS

Filed Jan. 7, 1963 6 Sheets-Sheet 1

INVENTORS
ROBERT R. WAHRER
DONALD S. JOHNSTON
BY
Ooms, McDougall & Hersh
ATTORNEYS July 18, 1967 R. R. WAHRER ETAL 3,332,084

INCREMENTALLY DRIVEN RECORDING APPARATUS

Filed Jan. 7, 1963

6 Sheets-Sheet 2

INVENTORS
ROBERT R. WAHRER
DONALD S. JOHNSTON
BY Ooms, McDougall & Hersh
ATTORNEYS July 18, 1967 R. R. WAHRER ETAL 3,332,084

INCREMENTALLY DRIVEN RECORDING APPARATUS

Filed Jan. 7, 1963 6 Sheets-Sheet 3

INVENTOR.
ROBERT R. WAHRER
DONALD S. JOHNSTON
BY Ooms, McDougall & Hersh
ATTORNEYS July 18, 1967 R. R. WAHRER ETAL 3,332,084

INCREMENTALLY DRIVEN RECORDING APPARATUS

Filed Jan. 7, 1963 6 Sheets-Sheet 4

INVENTORS
ROBERT R. WAHRER
DONALD S. JOHNSTON

BY

Ooms, McDougall & Hersh

ATTORNEYS

INVENTORS
ROBERT R. WAHRER
DONALD S. JOHNSTON
BY
Ooms, McDougall & Hersh
ATTORNEYS INVENTORS
ROBERT R. WAHRER
BY DONALD S. JOHNSTON
Ooms, McDougall & Hersh
ATTORNEYS

United States Patent Office 3,332,084
Patented July 18, 1967

3,332,084
INCREMENTALLY DRIVEN RECORDING APPARATUS

Robert R. Wahrer, Glenview, and Donald S. Johnston, Northbrook, Ill., assignors to Cook Electric Company, Morton Grove, Ill., a corporation of Delaware Filed Jan. 7, 1963, Ser. No. 249,914
9 Claims. (Cl. 346—74)

This invention relates particularly to magnetic tape recording and reproducing machines for recording and reproducing digital signals, but is also applicable to recording and reproducing machines generally, and to other similar types of machines.

A recording or reproducing machine usually comprises a recording or reproducing head for recording or reproducing signals on a recording member, which may be in the form of a tape, wire, disk, belt, drum or the like. Many recording machines are also capable of reproducing or playing back signals recorded on the record member. Thus, the term "recording machine," as used herein, may usually be considered to include a reproducing machine.

The usual recording or reproducing machine is provided with driving means for effecting relative movement between the recording or reproducing head and the record member. The normal practice is to advance the record member past the head, which remains stationary. In most recording and reproducing machines, the record member is advanced continuously at a constant speed while the signals are being recorded or reproduced. In the case of machines for recording digital signals which may be spaced apart by long time intervals, the continuous movement of the record member may result in extremely inefficient utilization of the record member.

One object of the present invention is to provide a new and improved machine of the foregoing character in which the drive of the record member is incremental rather than continuous.

A further object is to provide a new and improved recording or reproducing machine in which the drive is caused to advance the record member through a predetermined increment for each signal or set of signals which is to be recorded.

Another object is to provide a new and improved recording machine in which movement of the record member relative to the recording head is started in response to each signal or set of signals to be recorded, and is stopped after the record member has advanced through a predetermined increment.

A further object is to provide a new and improved recording machine of the foregoing character in which the driving mechanism includes a control disk, belt or other member having openings, indicia, magnetic areas or other control elements together with means adjacent the control member for stopping the drive in response to the passage of each control element.

Another object is to provide a new and improved recording machine in which the control elements also trigger the recording of the data signals.

Another object is to provide a new and improved recording machine in which the record member is stopped during intervals in which no signal is being received for recording, and in which the record member is advanced incrementally in response to each received signal or set of signals.

A further object is to provide a new and improved reproducing machine in which the record member is advanced incrementally in response to the step commands from the device being controlled by the reproduced signals, and stop commands recorded on the record member.

Further objects and advantages of the present invention will appear from the following description, taken with the accompanying drawings, in which.

Figure 1:
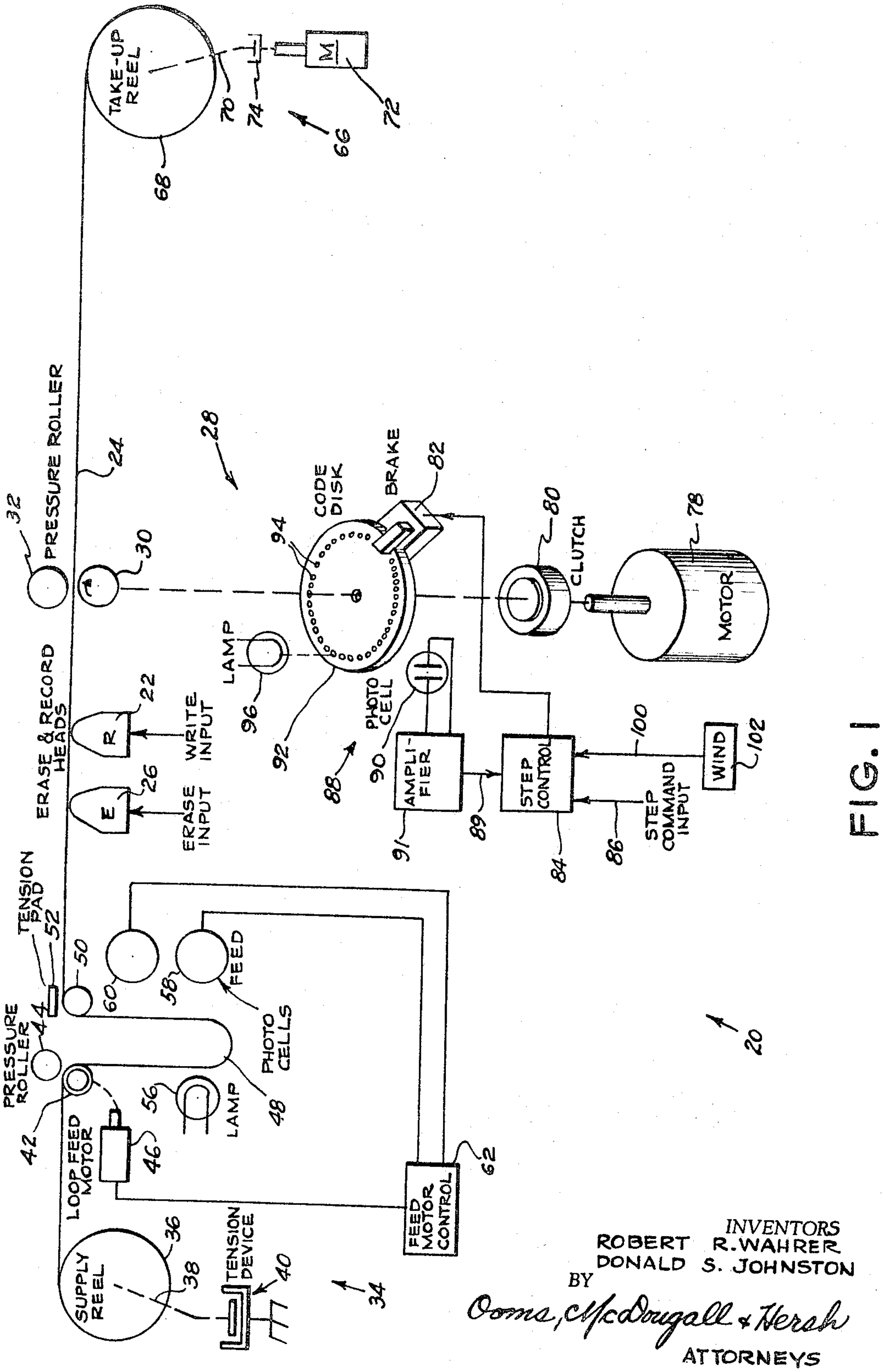
FIG. 1 is a diagrammatic view of a magnetic tape recorder to be described as one illustrative embodiment of the present invention.

As already indicated, FIG. 1 compares a diagrammatic illustration of a tape recorder 20 which is especially well adapted for recording signals representing digital data, when the individual signals or groups of signals may be separated by relatively long intervals of waiting time. While the invention is shown as applied to a magnetic tape recorded, it will be understood that the invention is applicable to various other types of recording and reproducing or reading machines, and other similar types of machines.

The illustrated recorder 20 comprises a recording head 22 which is adapted to produce recordings of electrical signals on a record member 24. In this case, the record member 24 is in the form of magnetic recording tape, but various other types of record members may be employed, such as disks, belts, drums, wires or the like. The invention is also applicable to machines in which the method of recording the signals on the record member is other than magnetic. Thus, for example, the invention is applicable to photoelectric recording.

In this case, an erasing head 26 is associated with the recording head 22. The erasing head is adapted to erase any previous recordings which may have been made on the magnetic tape. The recording and erasing heads may be combined in a single unit, if desired. The recording head 22 may be of the multi-channel type adapted to record a plurality of channels on the tape 24.

The recording machine 20 is provided with a driving mechanism 28 for effecting relative movement between the recording head 22 and the record member 24. In accordance with the usual practice, the illustrated driving mechanism 28 is adapted to advance the tape 24 past the recording head 22, which remains stationary. Thus, the driving mechanism 28 comprises a capstan or drive roller 30 adapted to engage the tape 24. A pressure roller 32 is provided to press the tape against the capstan 30.

A supply mechanism 34 is provided to supply the magnetic tape to the recording head 22 and thence to the capstan 30. In this case, the supply mechanism comprises a supply reel 36 on which a considerable length of the tape may be wound. The reel 36 may be mounted on a shaft 38 which may be provided with a drag brake 40 or some other device for developing tension in the tape as it is pulled off the reel 36.

While the capstan 30 might be relied upon to pull the tape off the reel 36, it is preferable to employ a separate drive roller or capstan 42 for this purpose, so as to avoid variations in the tension on the tape as it passes the recording head 22. A pressure roller 44 is employed to press the tape against the drive roller 42. A separate motor 46 is preferably provided for driving the roller 42.

After passing the drive roller 42, the tape 24 is preferably formed into a depending slack loop 48, which extends between the drive roller 42 and an idler roller 50. The tape 24 is preferably pressed against the roller 50 by a frictional tensioning pad 52.

From the roller 50, the tape 24 passes to the erase head 26 and the recording head 22. From the recording head 22 the tape passes directly to the main capstan 30.

The speed of the feed motor 46 may be controlled so as to maintain and regulate the slack loop 48. Such controls will be known to those skilled in the art. The illustrated control is of the photoelectric type, comprising a lamp 56 on one side of the slack loop 48 and two photocells 58 and 60 on the opposite side of the loop. The photocells 58 and 60 are connected to a control unit 62 for regulating the speed of the motor 46. The arrangement may be such that the motor 46 will be stopped if the loop 48 becomes long enough to cut off both of the photocells 58 and 60 from the lamp 56. If, on the other hand, the loop 48 becomes short enough so that both photocells 58 and 60 are illuminated by the lamp 56, the motor 46 will be run at high speed. If the loop 48 is of intermediate length so that the photocell 58 is illuminated while the photocell 60 is obscured, the motor may be operated at a lower speed.

The recording machine 20 is provided with a mechanism 66 for receiving the magnetic tape from the capstan 30. The illustrated mechanism 66 comprises a takeup reel 68 on which the tape 24 is wound as it is received from the capstan 30. The takeup reel 68 may be mounted on a shaft 70 driven by a takeup motor 72. A slip clutch or other slipping drive device 74 may be connected between the motor 72 and the takeup reel shaft 70 so that the reel 68 will be driven at a speed which is only sufficient to take up the tape as it is advanced by the capstan 30.

The driving mechanism 28 is adapted to advance the capstan 30 through a predetermined increment for each signal or set of signals to be recorded. Thus, only a predetermined length of the magnetic recording tape 24 is used for recording each signal or set of signals. In response to each signal or set of signals, the tape is advanced through a predetermined increment and then is stopped to await another signal or set of signals. It will be understood that a set of several signals is recorded simultaneously in the case of a multi-channel recorder.

In this case, the driving mechanism 28 comprises a motor 78 which is coupled to the capstan 30 by a slip clutch 80 or other drive device adapted to apply torque to the capstan. An electrically operated brake 82 is preferably employed to stop the capstan. When the brake 82 is released, the capstan 30 is rotated by the motor 78 and the clutch 80. When the brake 82 is actuated, the capstan 30 is stopped despite the tendency of the motor 78 and the clutch 80 to rotate the capstan.

In this case, the brake 82 is controlled by a control unit 84 having an input circuit 86 to which step command signals are applied. Such signals may be the actual data signals to be recorded, or special step command signals generated by the source of data signals, in response to or in synchronism with the production of data signals. Each step command signal is effective to release the brake 82. An increment control device 88 is also connected to a stop input 89 of the control unit 84 for actuating the brake 82 after the capstan 30 has been rotated through a predetermined increment. In this case, the increment control device 88 comprises a photocell 90 connected to the input of an amplifier 91, which has its output connected to the control unit 84. The photocell 90 is adapted to sense the movement of a control or code disk 92 which is coupled to the capstan 30 so as to rotate therewith. The disk 92 is provided with a series of spaced control elements which are illustrated as openings 94 but may take the form of indicia or other detectable elements on the disk. As shown, the photocell 90 is opposite the openings 94 and is disposed on one side of the disk 92. A lamp 96 is disposed opposite the openings 94 on the opposite side of the disk. Light from the lamp 96 is adapted to pass successively through each of the openings 94 and on to the photocell 90. Thus, the photocell 90 is adapted to detect the passage of each opening 94. The signal developed by the photocell 90 upon the passage of each opening 94 is utilized by the control unit 84 to actuate the brake 82.

For convenience, the control unit 84 may also be provided with an input circuit 100 controlled by a rapid winding switch 102 which may be operated to release the brake 82 continuously so that the tape will be rapidly wound onto the takeup reel 68. The switch 102 may be operated by the person who changes the reels of magnetic tape so that the remaining tape may be wound rapidly onto the takeup reel 68. A new supply reel and a new takeup reel may then be mounted on the machine, and the tape may be threaded through the machine between the new reels.

In the recording machine 20 of FIG. 1, the electrically operable brake 82 is adapted to engage the control disk 92. When actuated, the brake 82 stops the disk 92 and thereby stops the capstan 30.

Figure 2:
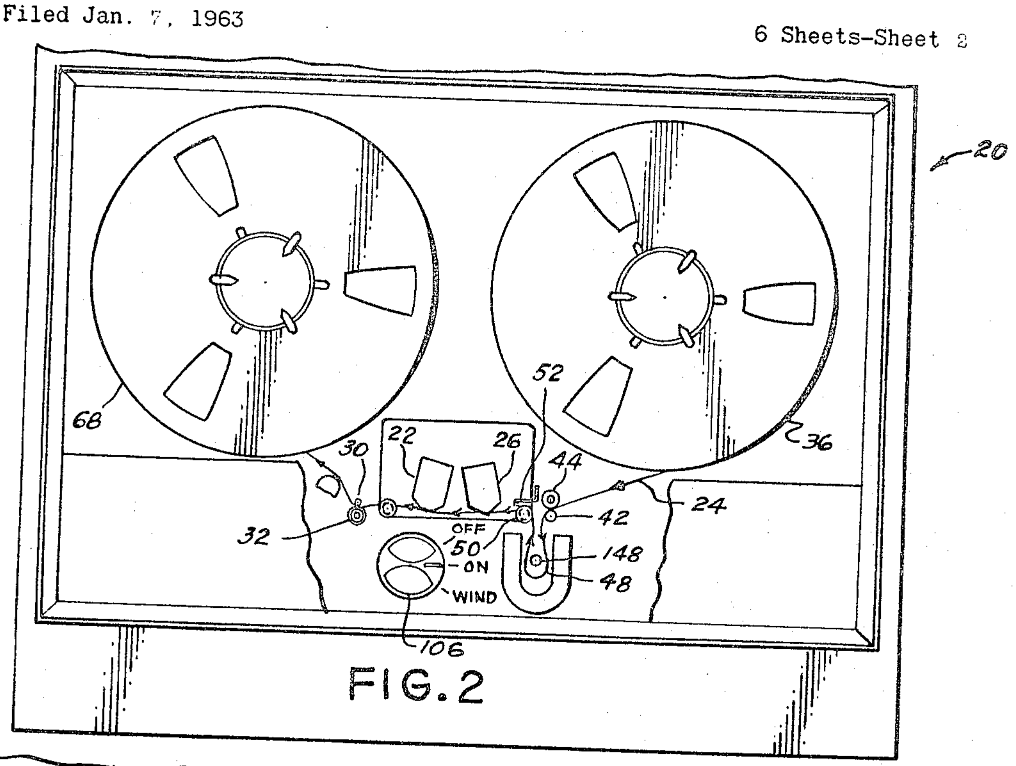
FIG. 2 is an elevational view of the tape recorder with certain parts broken away.
Figure 3:
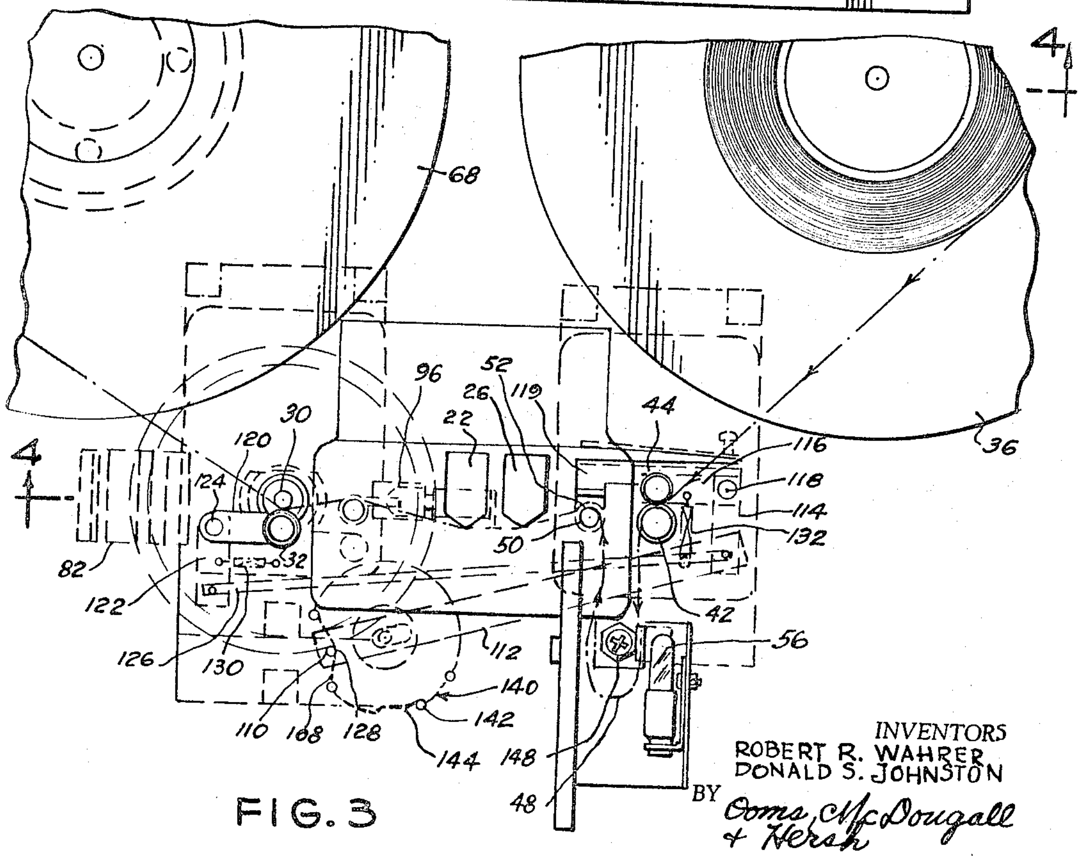
FIG. 3 is a fragmentary enlarged elevational view showing further details of the tape recorder.

Additional details of the tape recorder 20 are shown in FIGS. 2 and 3. For convenience, the tape recorder 20 may be provided with a three-position control knob 106. As shown, the knob 106 is in its central position which is the recording or "on" position. The knob 106 may be turned in one direction to its "off" position, and in the opposite direction to its "wind" position, in which the tape is rapidly wound onto the takeup reel. In the "off" and "wind" positions, the pressure rollers 32 and 44 are preferably disengaged from the corresponding capstans 30 and 42. In addition, the friction pad 52 is moved away from the roller 50. This may be brought about by a cam 108 (FIG. 3) which is operable by the knob 106. The cam 108 is engaged by a follower pin or roller 110. As shown, the follower 110 is mounted on a link 112 connected to an arm 114. The pressure roller 44 is preferably mounted on another arm 116 which is secured to the arm 114. Both arms 114 and 116 are mounted on a pivot 118. The frictional tensioning pad 52 may be mounted on another arm 119 connected to the pivot 118.

As shown, the pressure roller 32 is similarly mounted on an arm 120 connected to another arm 122. Both arms 120 and 122 are mounted on a pivot 124. A second link 126 is connected between the arms 114 and 122.

When the knob 106 is in its "on" position, the follower 110 engages a low point or valley 128 in the cam 108. For this position of the cam 108, the pressure rollers 32 and 34 are pressed against the capstans 30 and 42 by springs 130 and 132. In addition, the friction pad 52 is pressed against the roller 50. When the cam 108 is rotated in either direction, the follower 110 is moved to the left, as shown in FIG. 3, so as to swing the pressure rollers 32 and 44 away from the capstans 30 and 42. At the same time, the pad 52 is swung away from the roller 50.

The control knob 106 may also be arranged to operate the rapid wind switch 102 when the knob 106 is rotated to its "wind" position. For this purpose, the cam 108 may have another portion 140 adapted to operate a follower 142 connected to the rewinding switch 102. When the knob 106 is rotated to its "wind" position, the cam portion 140 displaces the follower 142 downwardly so as to operate the switch 102. When the knob 106 is in its "on"

and "off" positions, the follower 142 engages a low portion 144 of the cam and thus is not displaced. The knob 106 may also be connected to switches for de-energizing the various motors and other circuits in the "off" position of the knob.

A roller 148 may be provided to prevent the slack loop 48 from being lost entirely when the machine is set up for rapid winding. As shown in FIG. 3, the roller 148 is disposed within the loop 48. During normal operation of the machine, the loop 48 does not engage the roller 148. During the rapid winding operation, the loop 48 is contracted so that it engages and is guided by the roller 148.

Figure 4:
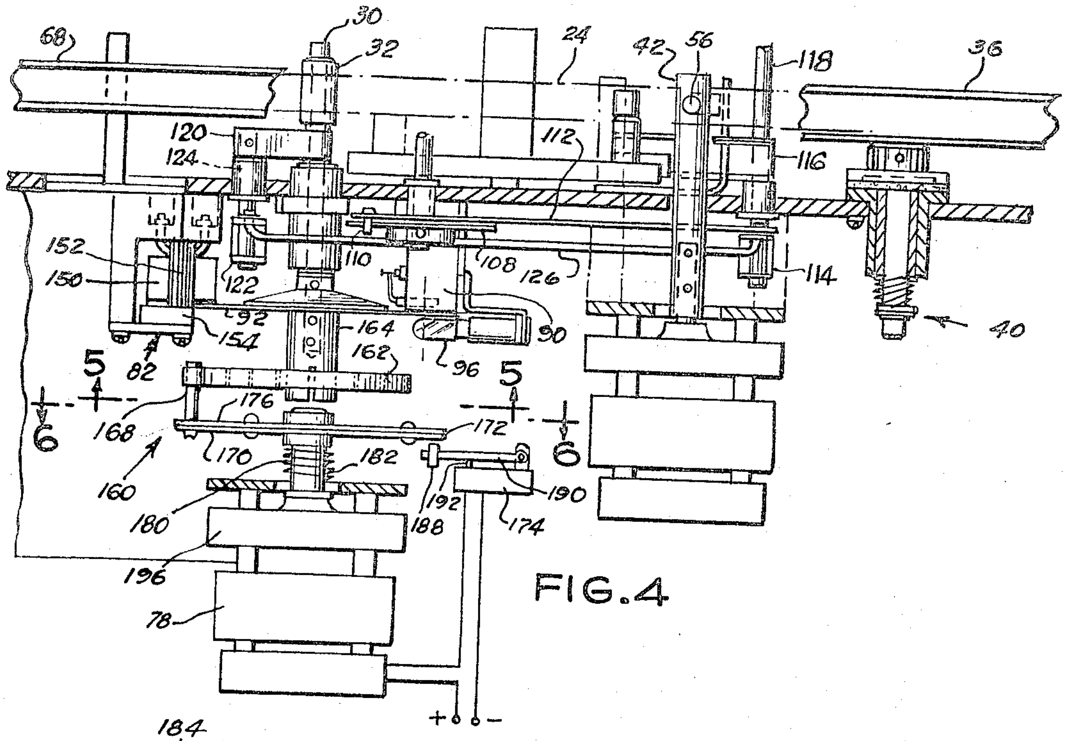
FIG. 4 is a somewhat diagrammatic sectional view taken generally along a line 4—4 in FIG. 3 and showing details of a driving mechanism differing slightly from that shown in FIG. 1.

As shown in FIG. 4, the brake 82 comprises a coil 150 which is mounted on a magnetic core 152. The disk 92 is movable between the core 152 and an armature or shoe 154. When the coil 150 is energized the magnetic attraction between the core 152 and the armature 154 causes the disk to be clamped between the core and the armature.

FIGS. 4–7 illustrate a modified driving device 160 which may be connected between the main drive motor 78 and the main capstan 30, in place of the slip clutch 80 of FIG. 1. The drive device 160 comprises a spiral coil spring 162 which is adapted to be wound up by the motor 78 so as to apply torque to the capstan 30. As shown, the inner end of the spring 162 is secured to a shaft 164 to which the capstan 30 is connected. The outer end of the spring 162 may be connected to a post or pin 168 which may be mounted on a disk 170. In this case, the disk 170 constitutes one element of a torque responsive coupling 172 connected to the motor 78 and adapted to operate a control switch 174 for de-energizing the motor 78 when the spring 162 has been wound to the desired torque. The coupling 172 comprises another disk 176 adjacent the disk 170. The post 168 passes through a slot 178 in the disk 176. It will be evident that the slot 178 permits a limited angle of relative rotation between the disks 170 and 176. In this case, the disk 176 is secured to the output shaft 180 of the motor 78, while the disk 170 is loosely mounted on the shaft 180. A helical coil spring 182 is mounted around the shaft 180 to bias the disk 170 against the disk 176.

Figure 6:
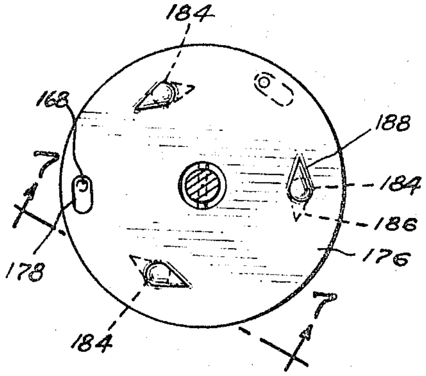
FIG. 6 is a sectional view taken generally along a line 6—6 in FIG. 4.
Figure 5:
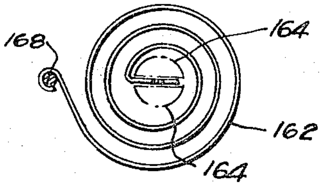
FIG. 5 is a fragmentary sectional view taken generally along the line 5—5 in FIG. 4.
Figure 7:
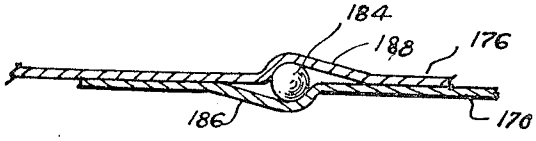
FIG. 7 is a fragmentary enlarged sectional view taken generally along a line 7—7 in FIG. 6.

It will be seen from FIGS. 6 and 7 that a set of camming balls 184 is disposed between the disks 170 and 176. Camming grooves 186 and 188 are formed in the respective disks 170 and 176 to receive the balls 184. If any relative rotation occurs between the disks 170 and 176, the camming balls 184 and grooves 186 and 188 cause the disk 170 to be moved away from the disk 176, against the biasing action of the spring 182. The switch 174 is adapted to be spaced by a roller 188 which is normally spaced from the disk 170 but is adapted to be engaged and moved by the disk 170 when it is moved away from the disk 176 by the action of the camming balls 184. The roller 188 may be mounted on a lever 190 adapted to engage and operate the plunger 192 of the switch 174.

During normal operation, the motor 78 runs whenever it is necessary to wind the spring 160 to the desired torque. The spring 182 is of such a strength that the disk 170 will be cammed away from the disk 176 when the spring 162 has been sufficiently wound. The movement of the disk 170 operates the switch 174 and thereby de-energizes the motor 78. The motor 78 may be of the geared down type having a gear box 196 providing a high enough ratio to be irreversible so that the spring 162 will be incapable of driving the motor backwards when the motor is de-energized. The torque responsive coupling 160 of FIG. 4 has the advantage that the motor 78 does not have to be energized during periods when no signals are being recorded. The spring 162 provides continuous torque which will rotate the capstan 30 whenever the brake 82 is released. The motor 78 needs to run only when the spring 162 unwinds sufficiently to permit the disk 170 to move away from the roller 188 of the control switch 174. The torque responsive coupling 160 does not involve the high frictional power loss which is characteristic of a slip clutch.

Figure 9:
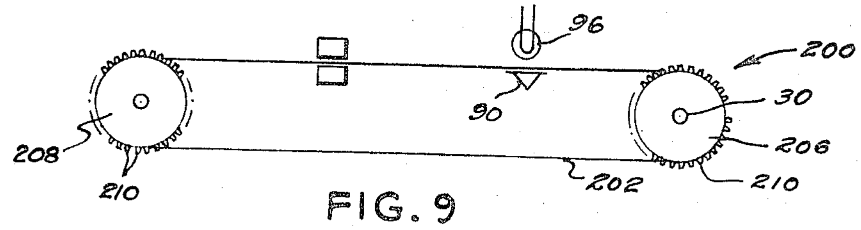
FIG. 9 is a fragmentary elevational view illustrating a modified control mechanism for the tape recorder.
Figure 10:
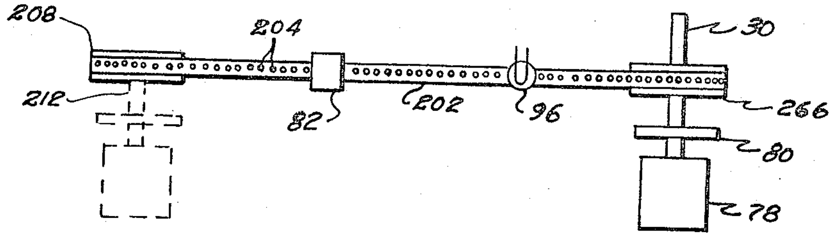
FIG. 10 is a plan view of the control mechanism of FIG. 9.

FIGS. 9 and 10 illustrate a modified incremental driving mechanism 200 for the capstan 30. The incremental driving mechanism 200 may be substituted for the mechanism shown in FIG. 1. Thus, the control disk 92 is replaced with a control belt 202 having a series of spaced openings 204 therein. Preferably, the belt 202 is threaded around sprockets 206 and 208 having teeth 210 adapted to be received in the openings. In this way, the belt 202 forms a positive driving connection between the sprockets 206 and 208. As shown, the sprocket 206 is connected to the capstan 30, while the sprocket 208 is mounted on a shaft 212 parallel to the axis of the capstan 30. As before, the motor 78 may be connected to the capstan by the slip clutch 80. Alternatively, the motor may be coupled to the shaft 212.

Instead of acting on the disk 92, the electrically operable brake 82 acts on the belt 202 in the arrangement of FIGS. 9 and 10. The openings in the belt 202 may be employed to stop the capstan 30 after it has been advanced through each increment. This may be accomplished by employing a sensor to detect the passage of each opening. The arrangement may be similar to that of FIG. 1, in that the photocell 90 may be mounted on one side of the belt 202, while the lamp 96 is mounted on the other side of the belt. The disk 92 and the belt 202 illustrate two types of control members for the incremental drive. Various other types of control members may be employed, carrying various types of spaced control elements, such as openings, marks, magnetized elements or magnetically permeable elements, for example. A magnetic sensor may be employed in place of the photoelectric sensor when the control elements are magnetized or magnetically permeable. In some cases, still other types of sensors may be employed.

Figure 8:
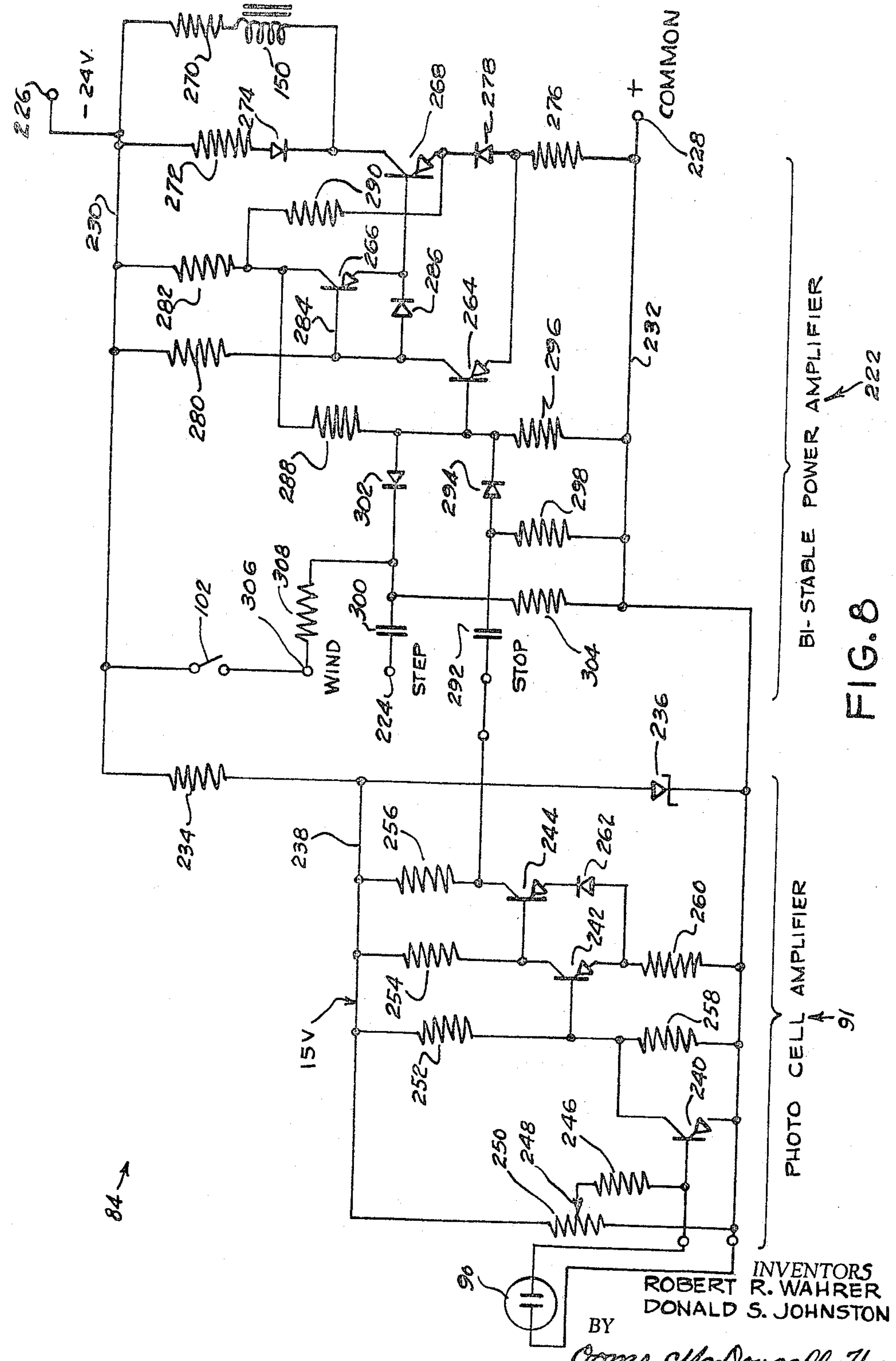
FIG. 8 is a schematic wiring diagram of the electrical control system for starting and stopping the capstan movement in the tape recorder.

FIG. 8 illustrates the details of the electrical circuit for the control unit 84 of FIG. 1. It will be recalled that the control unit 84 controls the energization of the brake coil 150. Each step command signal is adapted to de-energize the brake coil 150 so that the tape will be advanced. The photocell 90 is then adapted to cause re-energization of the brake coil 150 in response to the passage of the next opening 94 in the disk 92.

As already indicated, the photocell amplifier 91 is adapted to amplify the signals generated by the photocell 90. The photocell signals are then applied to a bi-stable power amplifier 222 to which the brake coil 150 is connected. The step signals are applied to the amplifier 222 by way of an input terminal 224.

In this case, the control unit 84 is fully transistorized so that the unit may be operated from a relatively low voltage of approximately 24 volts D.C. applied between negative and positive power supply terminals 226 and 228. A negative supply lead 230 is connected to the terminal 226. A lead 232 serving as the common positive lead is connected to the terminal 228. A somewhat lower voltage of approximately 15 volts D.C. may be provided for operating the photocell amplifier 91 by connecting a voltage dropping resistor 234 and a voltage stabilizing zener diode 236 between leads 230 and 232. A 15-volt negative lead 238 is connected to the junction of the resistor 234 and the diode 236.

The illustrated photocell amplifier 91 employs three successive stages of amplification utilizing transistors 240, 242 and 244. It will be seen that the photocell 90 is connected between the base and the emitter of the first transistor 240, the emitter being connected to the positive common lead 232. A biasing voltage for the base of the transistor 240 is supplied through a resistor 246 from the slider 248 of a potentiometer 250 connected between the negative and positive leads 238 and 232.

In the usual manner, load resistors 252, 254 and 256 are connected between the negative supply lead 238 and the collectors of the respective transistors 240, 242 and 244. Direct coupling is employed between the three transistor stages. Thus, the base of the transistor 242 is connected directly to the collector of the transistor 240. The base of the transistor 244 is connected directly to the collector of the transistor 242.

To control the bias on the transistor 242, resistors 258 and 260 are connected between the positive common lead 228 and the base and emitter, respectively, of the transistor 242. A diode 262 may be connected between the emitter of the transistor 242 and the emitter of the transistor 244.

The bi-stable power amplifier 222 is shown as comprising two control transistors 264 and 266 and a main or high power transistor 268. The brake coil 150, with a resistor 270 connected in series therewith, may be connected between the negative supply lead 230 and the collector of the transistor 268. To suppress the inductive kick of the coil 150, the series combination of a resistor 272 and a diode 274 may also be connected between the negative lead 230 and the collector of the transistor 268 so that the diode 274 and resistors 270 and 272 form a series circuit across the coil 150. The diode 274 is reversely polarized with respect to the normal direction of current between the collector and the negative lead 230. A resistor 276 and a diode 278 are connected in series between the positive common lead 232 and the emitter of the transistor 268. The emitter of the transistor 264 may be connected to the junction between the resistor 276 and the diode 278 so that the resistor 276 is common to the emitter circuits of both of the transistors 264 and 268.

Load resistors 280 and 282 are connected between the negative supply lead 230 and the collectors of the transistors 264 and 266, respectively. The collector of the transistor 264 is connected directly to the base of the transistor 266 by a lead 284. A diode 286 is connected from the collector of the transistor 264 to the base of the transistor 268 for temperature stability. The emitter of the transistor 266 is connected directly to the base of the transistor 268.

A coupling or feedback resistor 288 is connected between the collector of the transistor 266 and the base of the transistor 264. Another resistor 290 is connected between the collector of the transistor 266 and the emitter of the transistor 268.

To transmit pulses from the photocell amplifier to the bi-stable power amplifier 222, a capacitor 292 and a diode 294 are connected in series between the collector of the transssistor 244 and the base of the transistor 264. A resistor 296 is connected between the base of the transistor 264 and the positive supply lead 232. Another resistor 298 is connected between the positive lead 232 and the junction of the capacitor 292 and the diode 294.

It has already been indicated that the pulses from the photocell 90 are effective to energize the brake coil 150. Thus, the photocell pulses render the transistor 268 conductive. At the same time, the transistor 264 is rendered non-conductive, particularly by virtue of the feedback through the resistor 288.

As already indicated, each step command pulse or signal is utilized to cause de-energization of the brake coil 150. Such step signals are applied to the input terminal 224. A capacitor 300 and a diode 302 are preferably connected in series between the terminal 224 and the base of the transistor 264, the diode being polarized to transmit negative pulses. It will be noted that the diodes 294 and 302 are oppositely polarized. A resistor 304 is connected between the positive supply lead 232 and the junction between the capacitor 300 and the diode 302.

To bring about the rapid winding of the tape, as previously discussed, a continuous negative signal may be applied to a terminal 306 which may be connected to the junction between the capacitor 300 and the diode 302 by a resistor 308. The negative signal may be supplied by the rapid winding switch 102 which may be connected between the negative lead 230 and the terminal 306. The non-rapid winding signal renders the transistor 268 non-conductive and thereby de-energizes the brake coil 150.

The values of the various electrical components may be varied to a considerable extent. Those skilled in the art will be able to assign suitable values to the various components. However, for the convenience of those skilled in the art, the values in the following table have been found to be suitable:

*Resistors*

| Reference character: | Resistance in ohms |
|---|---|
| 234 | 82 |
| 246 | 180,000 |
| 250 | 10,000 |
| 252 | 33,000 |
| 254 | 5,600 |
| 256 | 2,700 |
| 258 | 18,000 |
| 260 | 330 |
| 270 | 12 |
| 272 | 10 |
| 276 | 0.33 |
| 280 | 1,800 |
| 282 | 180 |
| 288 | 15,000 |
| 290 | 820 |
| 296 | 3,300 |
| 298 | 5,600 |
| 304 | 5,600 |
| 308 | 3,300 |

*Capacitors*

| Reference character: | Capacitance—microfarads |
|---|---|
| 292 | .01 |
| 300 | .01 |

The operation of the tape recorder may be briefly summarized by noting that the data signals to be recorded on the magnetic tape 24 are applied to the recording head 22. Corresponding step command signals are applied to the input terminal 224 of the bi-stable power amplifier 222. The tape recorder is particularly well adapted for recording digital signals in the form of pulses. The actual data signals may be employed as step signals, but more frequently the step signals are produced by the source of data signals in synchronism with the data signals. Each step signal renders the transistor 264 conductive and thereby renders the transistor 268 non-conductive. The coil 150 of the brake 82 is thereby de-energized so that the control disk 92 is released. The motor 78 thereupon rotates the capstan 30 so that the tape 24 is advanced. Before the tape has started to move, the digital signal or set of signals has already been recorded on the tape by the recording head 22.

After the disk 92 has rotated through a small increment, the passage of the next opening 94 generates a signal in the photocell 90. This signal is amplified and applied to the transistor 264 so as to render it non-conductive and the transistor 268 conductive. Thus, the brake coil 150 is again energized. The action of the brake 82 stops the disk 92. Thus, the tape 24 remains stationary until another signal to be recorded is received.

Inasmuch as the tape 24 is advanced through only a small increment for each recorded signal, the tape is utilized very efficiently. Thus, a greatly increased number of digital signals may be recorded on the tape. Accordingly, the tape recorder will operate for a long time before it becomes necessary to put on a new reel of tape.

It will be apparent that the tape recorder is ideally suited for applications in which digital signals need to be recorded at more or less irregular intervals, and in which it is desirable that the tape recorder operate unattended for a long period of time. For example, the tape recorder is well suited for recording digital data whereby directly dialed long-distance telephone calls may be charged to the subscriber. In this situation, the tape recorder is called upon to record the number of the called party, the number of the calling party, and other data necessary to compute the amount of the charge. Such data may be received at irregular intervals with intervening intervals during which no data is received. The incremental recorder of the present invention prevents wastage of tape during the intervening intervals so that the tape reels last much longer before they need to be changed.

Figure 11:
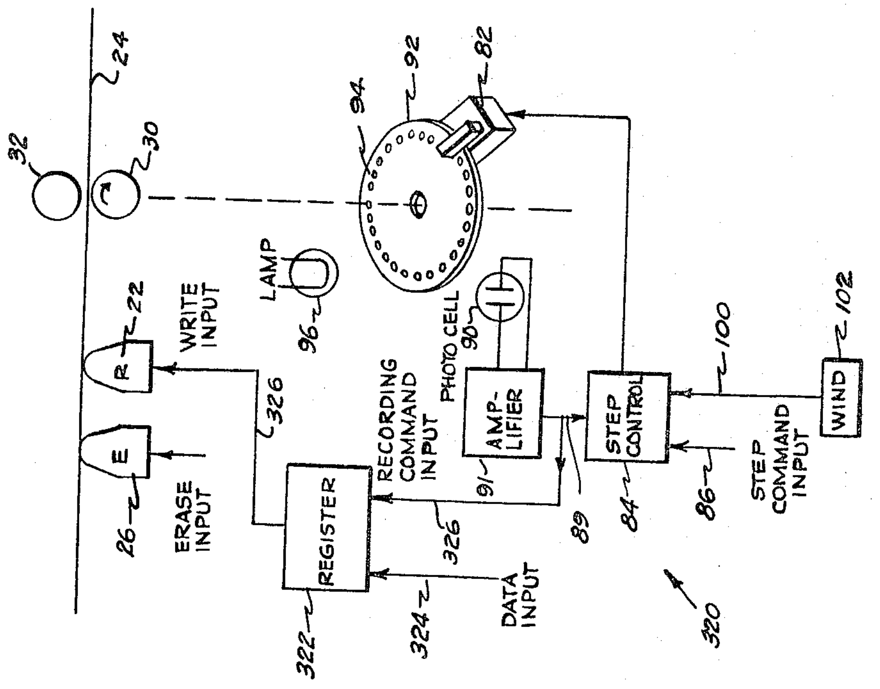
FIG. 11 is a fragmentary diagrammatic view similar to FIG. 1, but showing a modified recording machine.

FIG. 11 illustrates a modified recording machine 320 which to a large extent is the same as the recording machine 20 of FIG. 1. Insofar as the components shown in FIG. 11 are the same as illustrated in FIG. 1, they have been given the same reference characters and will not again be described in detail. The components of the recording machine which are not illustrated in FIG. 11 may be the same as in FIG. 1.

The recording machine 320 of FIG. 11 differs from the recording machine 20 of FIG. 1 in that the data signals to be recorded are temporarily stored in a register 322. Other suitable storage devices will also be known to those skilled in the art. In addition to controlling the brake 82, the photocell 90 is employed to trigger the register 322, whereupon the register feeds the stored data signals to the recording or writing head 22. Thus, the recording of the data signals takes place when one of the holes 94 in the rotating disk 92 passes the photocell 90 so that the light from the lamp 96 is permitted to fall upon the photocell. It will be understood that the recording of the data signals takes place while the tape 24 is moving. The signal generated by the photocell also causes the step control 84 to actuate the brake 82 so that the disk 92, the capstan 30, and the tape 24 are stopped shortly after the data signals have been recorded. It has been found that the arrangement of FIG. 11 makes it possible to space the recorded signals on the tape with a high degree of precision.

As illustrated in FIG. 11, the register 322 has a data input 324 to which the data signals are applied. The register 322 has an output circuit 326 connected to the recording head 22. As before, the signal from the photocell 90 is amplified by the amplifier 91 and is applied to the step control unit 84. In addition, the amplifying signal is applied to a recording command input 326 of the register 322. The photocell signal causes the register 322 to deliver the stored data signals to the recording head 22 and also is effective to clear the register so that the register will be ready to receive a new data signal or set of signals. If the recording head 22 is of the type having a plurality of channels for recording a plurality of data signals simultaneously, the register will have a corresponding number of channels, all controlled by the recording command input signal from the photocell amplifier 91. Each channel of the register will have a separate data signal input. As will be understood by those skilled in the art, each channel of the register 322 may comprise electronic devices such as flip-flops. The data signals are capable of changing the register from its initial state to a changed state representing the storage of data. When the recording command signal is received from the photocell amplifier 91, the register is returned to its original state, and a signal corresponding to the stored data is fed to the recording head 22.

Figure 12:
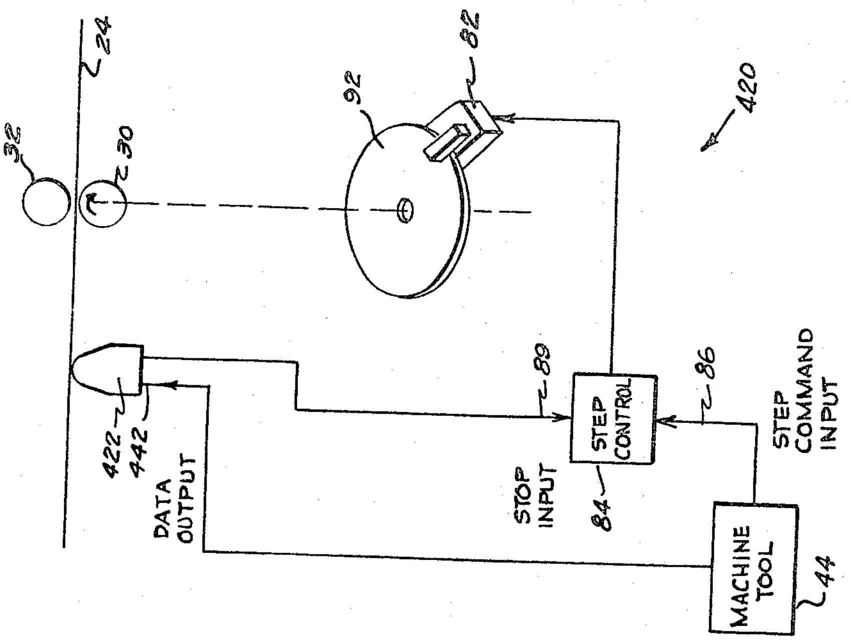
FIG. 12 is a fragmentary diagrammatic view similar to FIG. 1 but showing a reproducing machine.

FIG. 12 illustrates a reproducing or playback machine 420 which constitutes another illustrative embodiment of the present invention. Most of the components of the reproducing machine 420 may be the same as those of the recording machine 20 of FIG. 1. Those components of FIG. 12 which are the same as FIG. 1 have been given the same reference characters. The components of the machine not illustrated in FIG. 12 may be the same as in FIG. 1.

The reproducing machine 420 differs from the recording machine 20 in that the recording head 22 is replaced with a reproducing or reading head 422, adapted to produce electrical signals in response to the magnetically recorded signals on the tape 24, as the tape is moved past the reproducing head. Preferably, the reproducing head 422 is of the flux responsive type.

As before, the movement of the tape 24 is controlled by the brake 82 which is adapted to stop the disk 92 connected to the capstan 30. The brake 82 is adapted to be actuated by the step control unit 84. When step command signals are received at the input 86, the step control unit 84 releases the brake 82 so that the disk 92 and the capstan 30 are permitted to rotate under the torque constantly applied to the disk 92 by the motor 78 and the coupling device 80. In this case, the step command signals are obtained from an external source or device, usually the device which is controlled by the data signals produced by the reproducing machine 420. Thus, for example, the step command signals may be received from an automatic machine tool 440 which is controlled or programmed by the data recorded on the magnetic tape 24. The reading head 422 has one or more data output circuits 442 which are connected to the machine tool 440. It will be understood that the machine tool 440 is arranged so that it performs a series of functions or operations in response to the data signals from the reading head 422. When the machine tool has completed the operation or operations which have been commanded by the data signals, the machine tool produces a step signal which is fed to the step control unit 84 so as to release the brake 82 and permit the tape 24 to be advanced through a further increment. During the movement of the tape 24, additional data signals are supplied by the reading head 422 to the machine tool 440, so as to command an additional operation or operations.

As before, the step control unit 84 also controls the actuation of the brake 82 so as to stop the tape 24 after one or more data signals have been reproduced by the reading head 422. However, in this case, the stop signals are supplied to the step control unit 84 by the reading or reproducing head 422. It is not necessary to utilize the photocell 90, the lamp 96, and the holes 94 in the disk 92. The stop signals are produced by the reading head 422 and are supplied to the stop input of the step control unit 84. Preferably, the reading head 422 is of the multi-channel type, in which case the stop signals are recorded in one of the channels on the tape 24. The other channels are employed to supply data signals to the machine tool or other device to be controlled by the tape machine 420.

Thus, the recorded stop signals on the tape 24 may be of such a character that a stop signal is reproduced by the head 422 after a desired set of data signals has been reproduced and supplied to the machine tool 440. Thus, the tape 24 remains stationary, while the machine tool 440 is carrying out the operations commanded by the data signals. When the machine tool has completed the desired operations, the machine tool produces a step signal which causes the step control unit 84 to release the brake 82. In this way, the tape 24 is permitted to advance through an additional increment so that another set of data signals may be supplied to the machine tool. The tape is stopped by the next stop signal recorded on the tape.

It will be understood that the incremental reproducing machine 420 of FIG. 12 may be employed whenever it is desirable to reproduce recorded data incrementally. It is merely by way of example that the application of incremental reproducing to a machine tool has been disclosed. Thus, the incremental reproducing machine may be used to control various types of computers and many other types of machines.

It will be recognized that the present invention is applicable to other types of record members, besides magnetic tape, to various other types of recording and reproducing machines, and to other similar types of machines.

Various other modifications, alternative constructions and equivalents may be employed without departing from the true spirit and scope of the invention, as exemplified in the foregoing description and defined in the following claims.

We claim:

1. In a magnetic tape recorder,
the combination comprising a head for recording digital signals on magnetic tape,
a capstan for advancing the magnetic tape past said head,
means for supplying torque to said capstan and tending to rotate said capstan for advancing the tape,
an electrically operable brake for stopping said capstan,
signal-responsive means for releasing said brake and thereby initiating rotation of said capstan,
a disk coupled to and rotatable with said capstan,
said disk having a plurality of spaced openings therein,
photoelectric means adjacent said disk for sensing the passage of said openings,
and means operable by said photoelectric means for resetting said brake in response to the passage of each opening so as to stop said capstan after advancing through a predetermined increment.

2. In a magnetic recorder for recording information on a moving magnetic information storing medium, the combination comprising:
a recording head for magnetically recording signals on said medium,
a capstan for frictionally engaging said medium,
a drive means for moving said medium past both said recording head and said capstan,
electrically operable brake means for stopping said medium,
said capstan including a disk coupled to and rotatable therewith,
said disk having a multiplicity of light transmitting areas therein spaced at equal angular intervals around said disk,
a light source on one side of said disk,
light sensing means on the opposite side of said disk positioned to receive light from said light source through said light transmitting areas,
signal-responsive means for releasing said brake to initiate rotation of said capstan,
and means operable by said light sensing means to set said brake means and thereby stop said medium in response to the movement of a light transmitting area between said light source and said light sensing means.

3. The magnetic recorder of claim 2 wherein said brake means provides the sole means for retaining said capstan and operates solely by frictional engagement of said capstan independently of the position of said disk.

4. The magnetic recorder of claim 2 wherein said drive means is independent of said brake means.

5. The magnetic recorder of claim 2 wherein said drive means includes
a spring connected to apply torque to said drive means,
motor means for tightening said spring,
torque responsive means for stopping said motor only in response to the development of a predetermined maximum torque in said spring, and for starting said motor only in response to a predetermined minimum torque in said spring,
said motor means being independent of said brake means.

6. The magnetic recorder of claim 2 further including,
storage means connected to said recording head for storing data signals,
and means operable by said light sensing means for causing said storage means to discharge said stored data signals to said recording head.

7. In a machine for use with a recording medium, the combination comprising
a signal translating head for translating signals to said recording medium,
a rotatable drive member for effecting relative movement between the recording medium and said translating head,
a spring connected to said drive member for applying torque to said drive member,
motor means for tightening said spring,
torque responsive means for stopping said motor only in response to the development of a predetermined maximum torque in said spring, and for starting said motor only in response to a predetermined minimum torque in said spring,
and incremental control means permitting only incremental advancement of said recording medium in response to a control signal,
said incremental control means operating independently of said motor means.

8. In a machine for use with a record member,
the combination comprising a signal translating head,
a rotatable drive member for effecting relative movement between the record member and said translating head,
a spring connected to said drive member for applying torque to said drive member,
a brake connected to said drive member for stopping said member,
a motor for tightening said spring,
a coupling device connected between said spring and said motor,
and including torque responsive means for stopping said motor in response to the development of a predetermined torque in said spring,
means for releasing said brake to initiate movement of said drive member,
and means operable in response to predetermined rotation of said drive member for actuating said brake,
said drive member thereby being incrementally advanced.

9. In a magnetic tape machine,
the combination comprising a magnetic head,
a capstan for pulling the tape past said head,
a torsion spring for applying torque to said capstan,
a brake connected to said capstan for stopping said capstan,
a motor for tightening said spring,
a coupling device connected between said motor and said spring and including torque responsive means for stopping said motor in response to the development of a predetermined torque by said motor,
means for releasing said brake to initiate rotation of said capstan,
a control member coupled to and movable with said capstan,
and including a series of control elements,
and means responsive to the passage of each of said control elements for actuating said brake to stop said capstan after movement through a predetermined increment.

References Cited

UNITED STATES PATENTS 3,094,261 6/1963 Thompson ---------- 226—9

BERNARD KONICK, *Primary Examiner.*

A. I. NEUSTADT, *Assistant Examiner.*